(12) United States Patent
Solon et al.

(10) Patent No.: US 10,192,706 B2
(45) Date of Patent: Jan. 29, 2019

(54) UNDERMOLDED AND OVERMOLDED FUSE JOINTS

(71) Applicant: Shoals Technologies Group, LLC, Portland, TN (US)

(72) Inventors: Dean Solon, Portland, TN (US); George M. Solon, Tarpon Springs, FL (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 1 day.

(21) Appl. No.: 15/412,989

(22) Filed: Jan. 23, 2017

(65) Prior Publication Data

US 2017/0214234 A1   Jul. 27, 2017

Related U.S. Application Data

(60) Provisional application No. 62/281,807, filed on Jan. 22, 2016.

(51) Int. Cl.
*H02G 3/04* (2006.01)
*H02G 15/08* (2006.01)
*H01H 85/20* (2006.01)

(52) U.S. Cl.
CPC .......... *H01H 85/201* (2013.01); *H02G 15/08* (2013.01)

(58) Field of Classification Search
CPC .......... H01R 4/70; H01R 11/28; H01R 31/02; H01R 43/24; H02G 15/18; H02S 40/34; H02S 40/36; Y02E 10/50; H01H 85/042; H01H 85/044; H01H 85/201; H01L 31/0504; H01L 31/18; H01B 7/0045; Y10T 29/49194; Y10T 29/49195
USPC ........ 174/72 A, 135, 68.1, 68.3, 84 R, 71 R, 174/88 R; 439/620.28; 337/227, 228
See application file for complete search history.

(56) References Cited

U.S. PATENT DOCUMENTS

| | | | | |
|---|---|---|---|---|
| 4,778,948 A | * | 10/1988 | Fitch | H01R 4/72 174/92 |
| 5,903,209 A | * | 5/1999 | Stepniak | H01H 85/042 337/199 |
| 8,604,342 B2 | * | 12/2013 | Solon | H02G 15/18 174/72 A |
| 8,937,249 B2 | * | 1/2015 | Solon | H02G 3/16 136/244 |
| 9,774,179 B1 | * | 9/2017 | Marcath | H02G 15/10 |
| 2010/0139733 A1 | * | 6/2010 | Jonczyk | H01H 85/201 174/72 A |

* cited by examiner

*Primary Examiner* — Angel R Estrada
(74) *Attorney, Agent, or Firm* — Carla Gannon Law (57) ABSTRACT

A novel fuse joint may be incorporated into a wire harness for use in solar energy installations. The novel fuse joint interfaces an in-line fuse with the middle portion of a wire segment at one end of the fuse, and with a wire end at the other end of the fuse. In this manner the number of connection points required to achieve in-line fuse functionality is decreased, thereby improving safety and conductivity over conventional in-line fuses. The fuse is undermolded, and the undermold is overmolded in situ, thereby yielding a double molded fuse joint. The novel fuse joint may be incorporated into a wire harness with conventional in-line fuses.

17 Claims, 10 Drawing Sheets

UNDERMOLDED AND OVERMOLDED FUSE JOINTS

CROSS-REFERENCE TO RELATED APPLICATIONS

This application claims the benefit of US Provisional Patent Application 62/281,807 entitled Undermolded and Overmolded Fuse Joints, which was filed Jan. 22, 2016.

BACKGROUND OF THE INVENTION

The present invention relates to wire harness components, and more specifically, to a double-molded wire joint having an integrated fuse.

Figure 1:
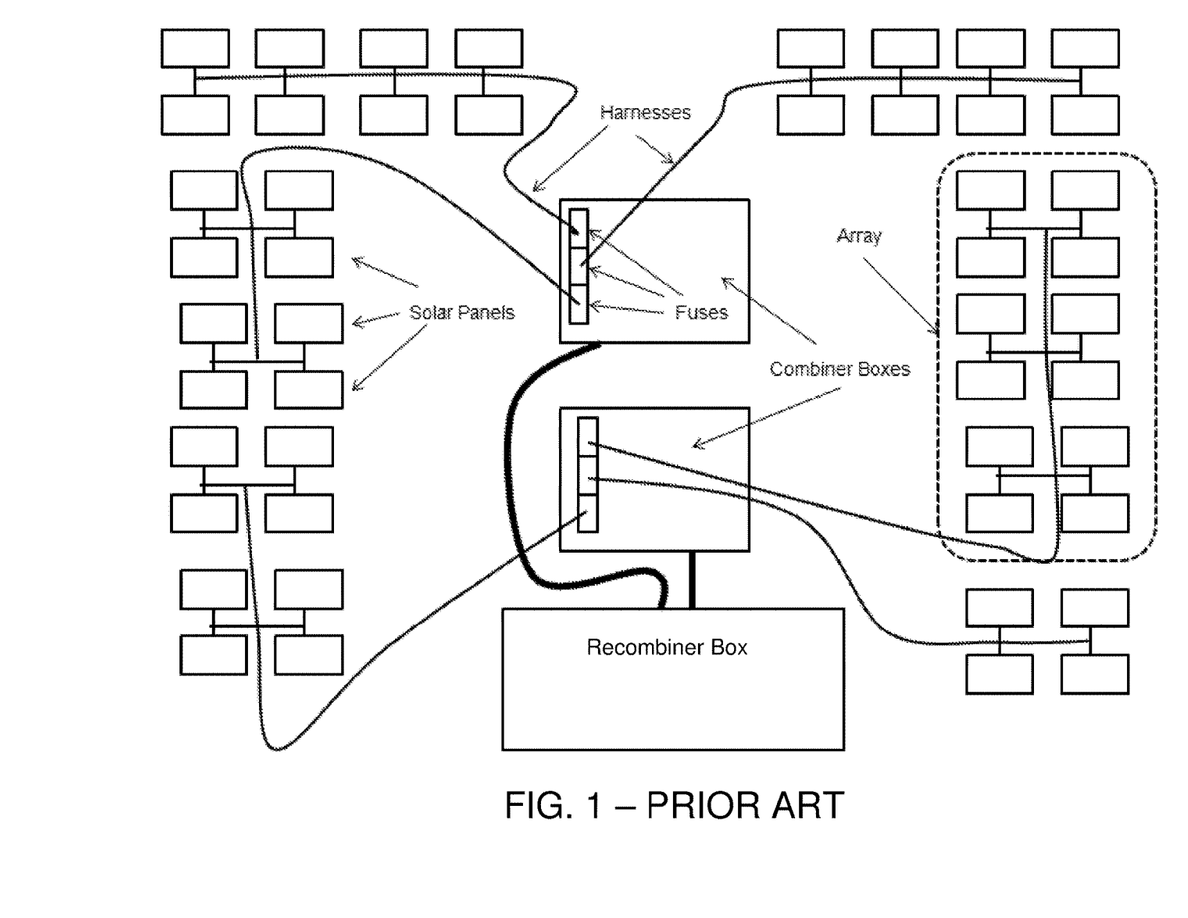
FIG. 1 schematically depicts a solar energy plant using wire harnesses, as known in the prior art.

Industrial-scale solar energy plants often use wire harnesses to simplify the challenge of combining multiple solar panels. By way of example, a standard wire harness typically has a single trunk with many branches, with each branch having at least one connector that engages a solar panel. In this manner a fairly large number of solar panels can "feed" their photovoltaic power into a trunk. Multiple trunks typically feed into a combiner box. This is depicted in FIG. 1. Without wire harnesses each individual solar panel would need to individually feed into a combiner box, which would be a cumbersome and dangerous cluster of wires.

Figure 2:
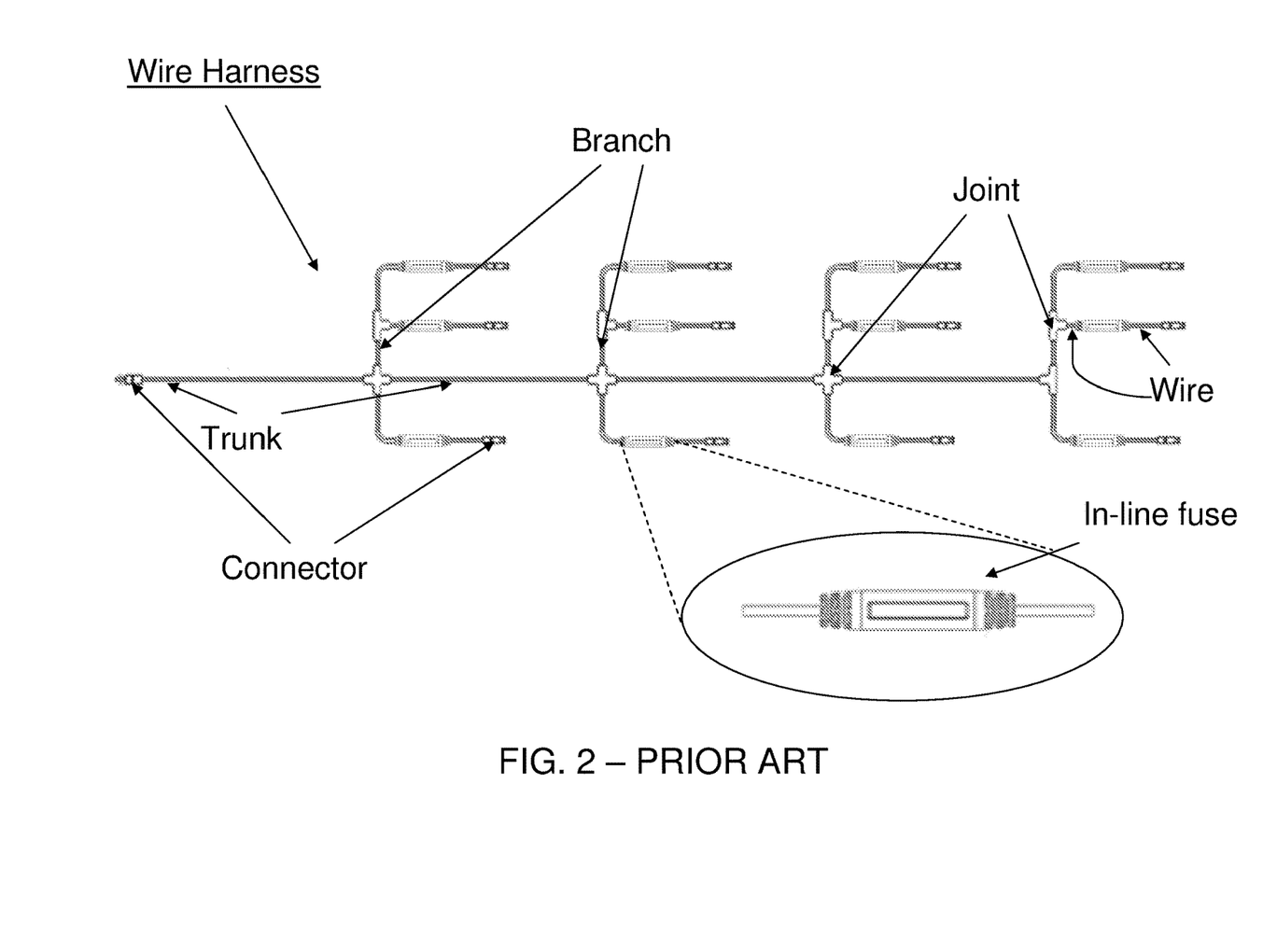
FIG. 2 depicts an improved wire harness including in-line fuses, as known in the prior art.

As shown in FIG. 2, a wire harness uses a variety of joints to form branches off a trunk, and to allow for multiple connectors on a single branch. Joints and wire harnesses are disclosed in U.S. Pat. No. 8,604,342 for LOW LEAKAGE ELECTRICAL JOINTS AND WIRE HARNESSES, AND METHOD OF MAKING THE SAME, which issued Dec. 10, 2013.

In early versions of wire harnesses each trunk would feed into a single fuse in the combiner box, as shown in FIG. 1. As a result, an issue with one panel could affect all panels in an array. In-line fuses, such as that depicted in FIG. 2, overcame this shortcoming. This improvement is disclosed in U.S. Pat. No. 8,937,249 for SOLAR ENERGY WIRE HARNESS WITH IN-LINE FUSES, which issued Jan. 20, 2015.

Figure 3:
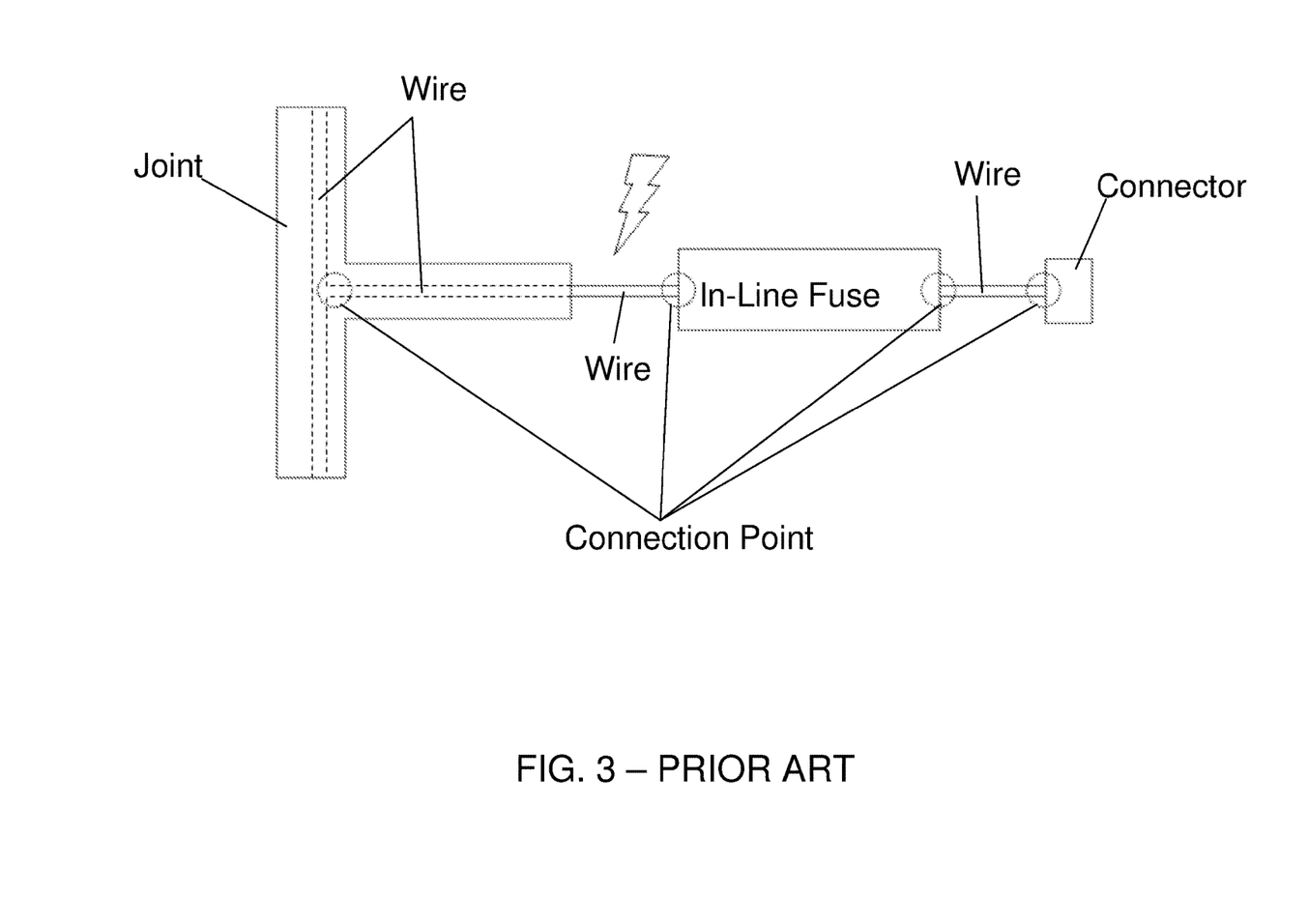
FIG. 3 schematically depicts a section of an improved wire harness showing a joint, in-line fuse, and connector, as known in the prior art.

A shortcoming of integrating in-line fuses into a wire harness, however, is the number of connection points required. As shown in FIG. 3, a segment of a wire harness incorporating a joint, in-line fuse, and connector requires four separate connection points. Because electrical and mechanical failures are more likely to occur in connection points, and because connection points are less efficient conductors, it is desirable to have as few connection points as possible.

Another shortcoming of wire harnesses having in-line fuses is the exposed wire section downstream of the in-line fuse, before the joint. This weak area is identified by an electrical bolt in FIG. 3. Because this section is downstream of the in-line fuse, a short would cause massive harness failure before popping the fuse.

Yet another related improvement was integrating a fuse with the connector, as disclosed in application Ser. No. 14/295,132, for a PHOTOVOLTAIC IN LINE FUSE CONNECTOR ASSEMBLY HAVING AN INTEGRAL FUSE, which was filed Jun. 3, 2014. All references are hereby incorporated in their entirety.

What is lacking, however, is a joint that is integrated with a fuse, which would streamline wire harnesses, offer better protection from an electrical and mechanical point of view, and reduce the number of connection points thereby providing higher efficiency and reliability.

SUMMARY OF THE INVENTION

A novel fuse joint may be incorporated into a wire harness for use in solar energy installations. The novel fuse joint interfaces an in-line fuse with the middle portion of a wire segment at one end of the fuse, and with a wire end at the other end of the fuse. In this manner the number of connection points required to achieve in-line fuse functionality is decreased, thereby improving safety and conductivity over conventional in-line fuses. The fuse is undermolded, and the undermold is overmolded in situ, thereby yielding a double molded fuse joint. The novel fuse joint may be incorporated into a wire harness with conventional in-line fuses.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—Fuse joint;
11—Alternative fuse joint;
12—Welded fuse;
13—Undermolded fuse;
20—Wire segment;
22—Exposed wire;
24—Insulation;
25—First wire segment;
26—Second wire segment;
27—Wire end;
28—Wire middle portion;
30—Fuse;

40—Undermold;
50—Overmold;
60—Wire harness;
62—Trunk;
64—Branch;
66—Connector;
68—Standard joint;
70—In-Line fuse;
80—Connection point;
81—First connection point;
82—Second connection point; and
83—Third connection point.

Broadly, fuse joints of the present invention include segments of wire that are joined at a fuse, with the fuse and wire junctions overlaid with an undermold, and the undermold overlaid with an overmold. It is within the scope of the invention to combine various fuses and joint types in order to achieve the desired functionality. For example, the fuses could be PV fuses from 2 to 30 amps, 600-2000 V; and the joints could be Y-shaped, T-shaped, I-shaped or X-shaped For simplicity generic fuses and T-shaped joints are depicted herein. Fuse joints are preferably used with high voltage, low current power. As used herein, "high voltage, low current power" means a voltage between 500 V and 2000 V, and a current between 2 A and 60 A; with voltage and current between 600 V and 1500 V, and 2 A and 30 A, respectively, being more preferred; and between 600 V and 1500 V, and 2 A and 20 A being most preferred.

Figure 4:
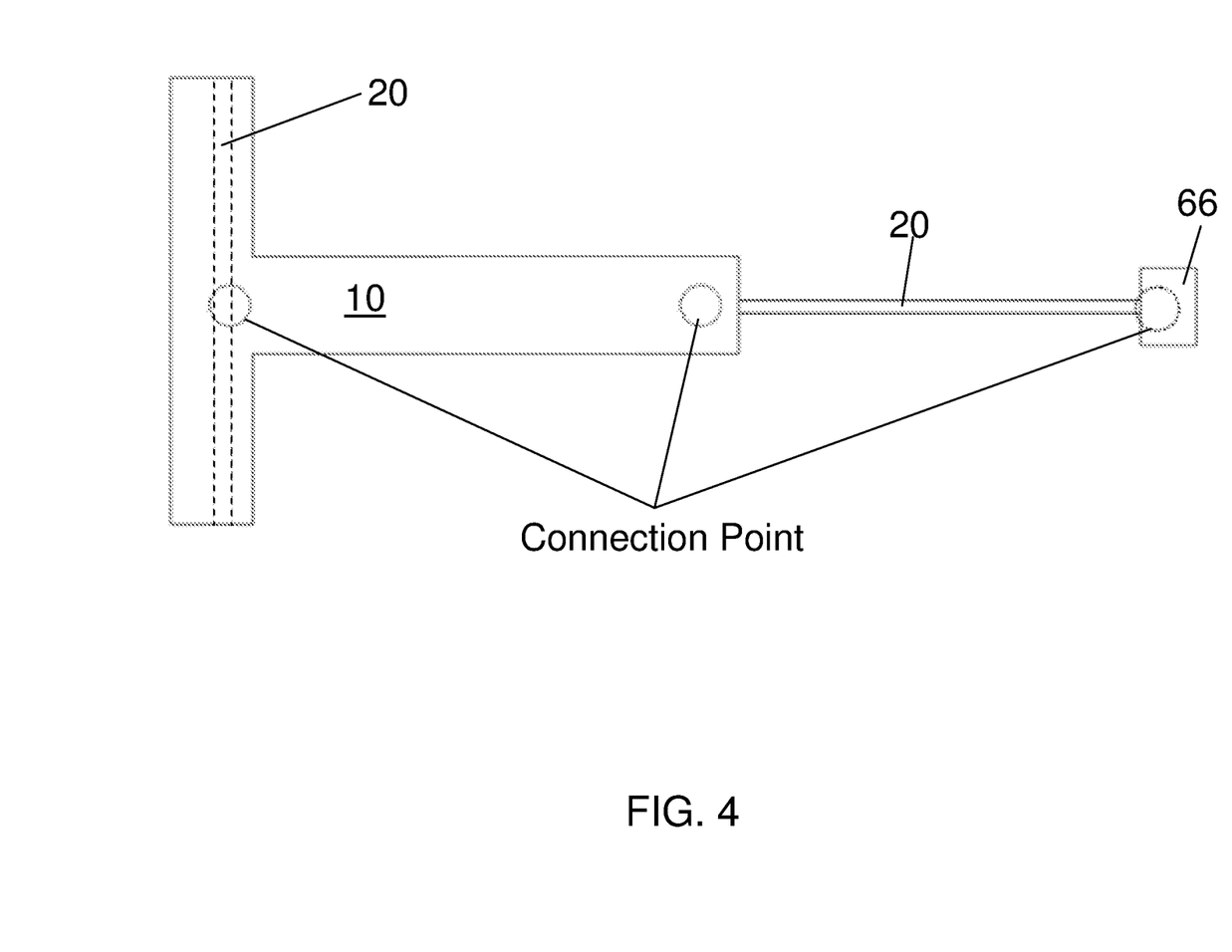
FIG. 4 schematically depicts a section of a wire harness showing the fuse joint and connector of the present invention.
Figure 5:
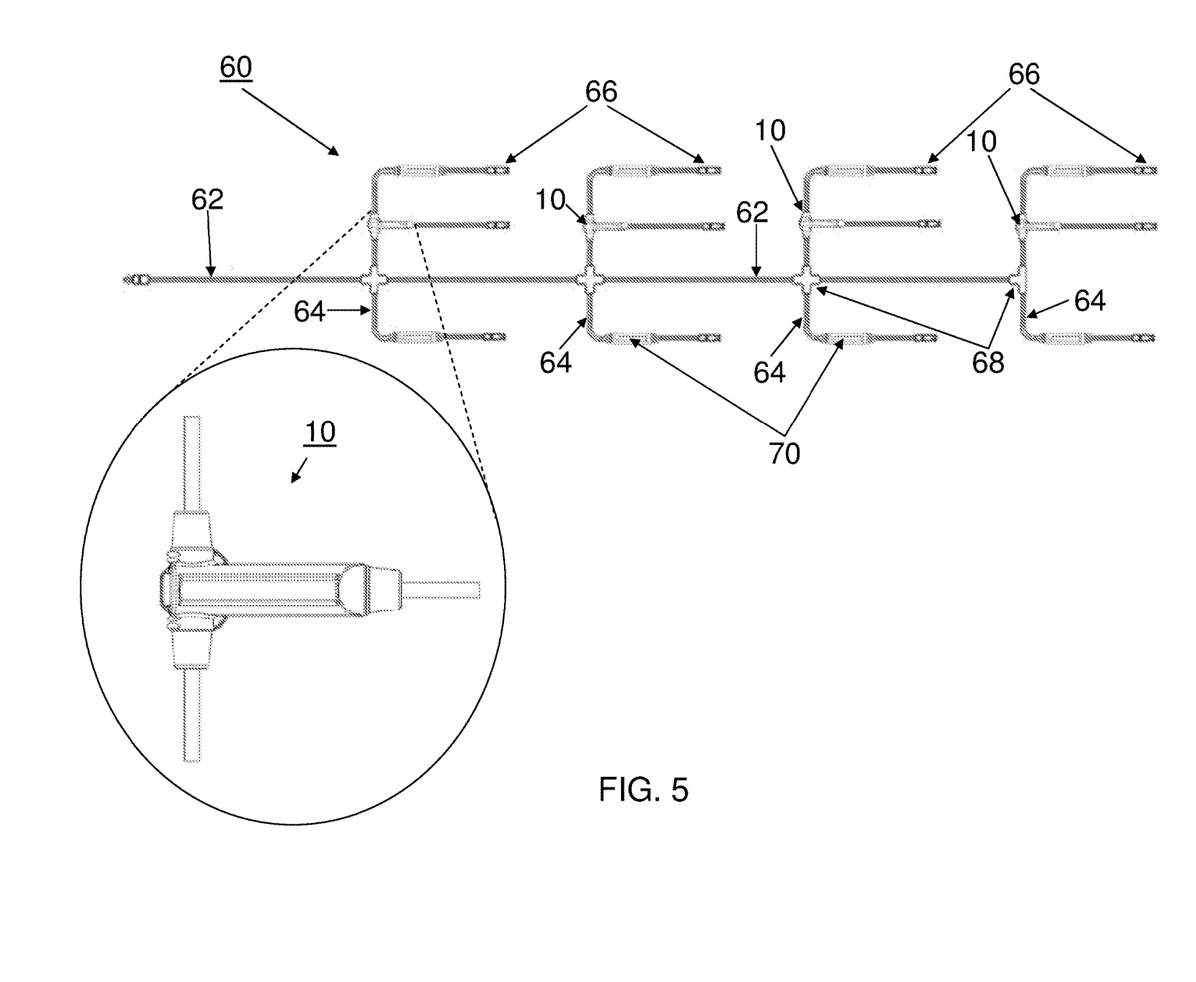
FIG. 5 depicts a wire harness incorporating fuse joints of the present invention.

Referring to FIG. 5, each fuse joint 10 is preferably incorporated on a branch string, immediately downstream from connector 66. Solar energy passes from a solar panel (not shown) through connector 66, then fuse joint 10, before going to trunk 62. Each connector 66 has a downstream fuse, either from fuse joint 10, or conventional in-line fuse 70. Thus, the present invention doesn't reduce the total number of fuses in a wire harness, but rather reduces the total number of connection points in a wire harness by incorporating fuse joints 10 which have less connection points. More specifically, as shown in FIG. 4, only three connection points are required when using fuse joint 10, whereas four connection points are required to accomplish the same thing in the conventional manner, as shown in FIG. 3.

Figure 12:
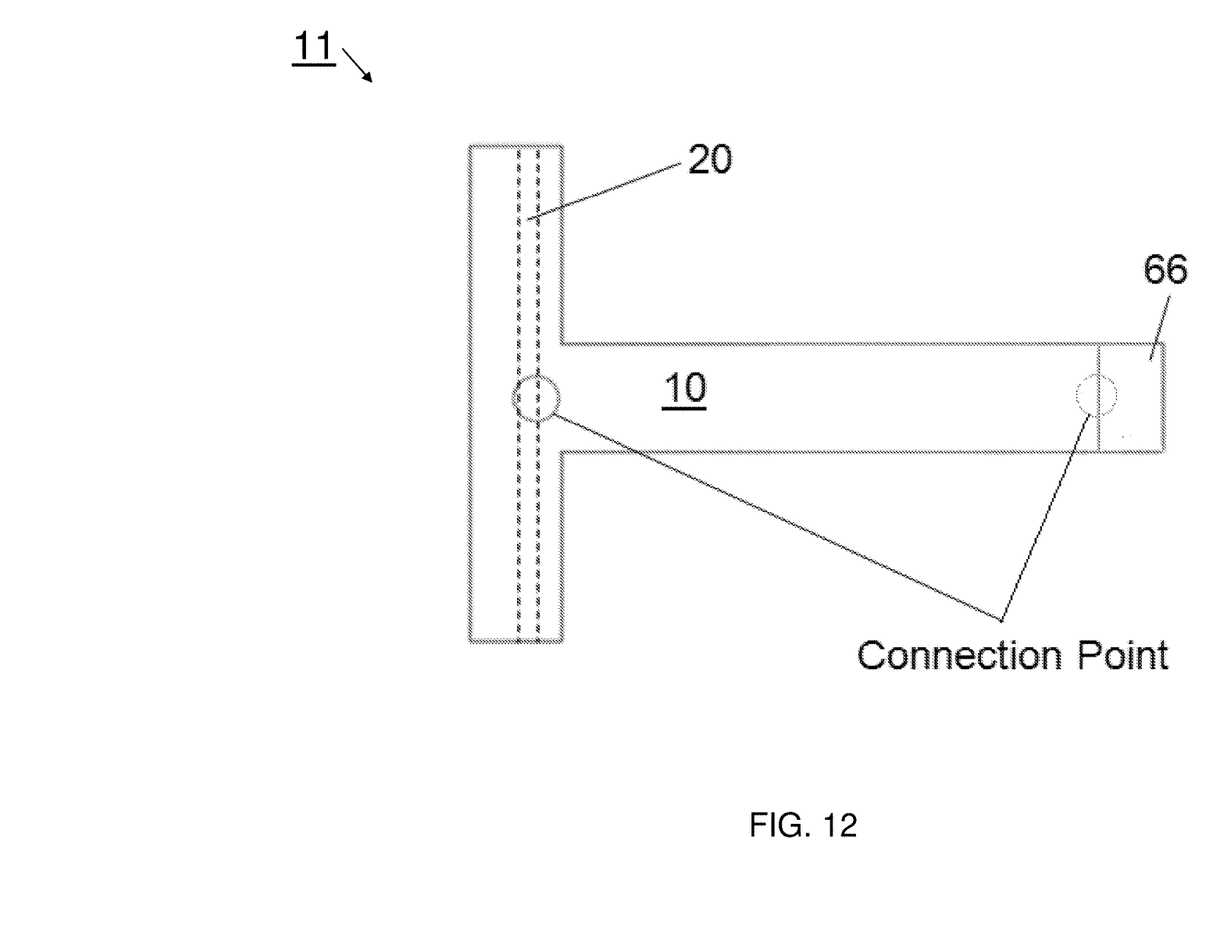
FIG. 12 is an alternative fuse joint.

Alternative fuse joint 11 of FIG. 12, has connector 66 attached directly to fuse joint 10. Said another way, it is lacking one wire segment 20. This embodiment has only two connection points.

Fuse joints of the present invention preferably undergo three stages to become a fuse joint. The first stage is welded fuse 12 of FIGS. 6 and 7; the second stage is undermolded fuse 13 of FIGS. 8 and 9; and the final stage is the overmolded fuse, which is fuse joint 10. Said another way, fuse joint 10 preferably includes both an undermold and an overmold.

Figure 6:
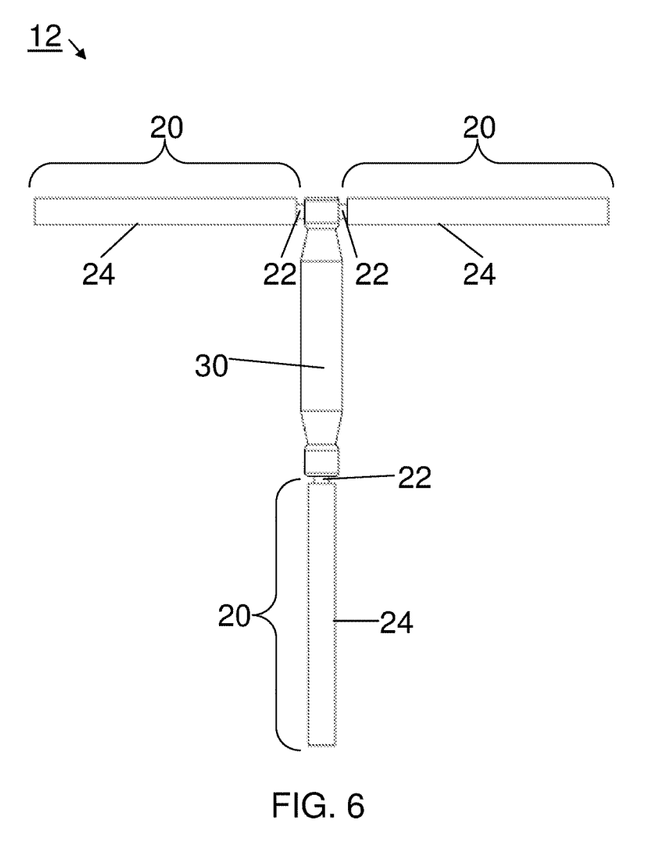
FIG. 6 is a welded fuse.
Figure 7:
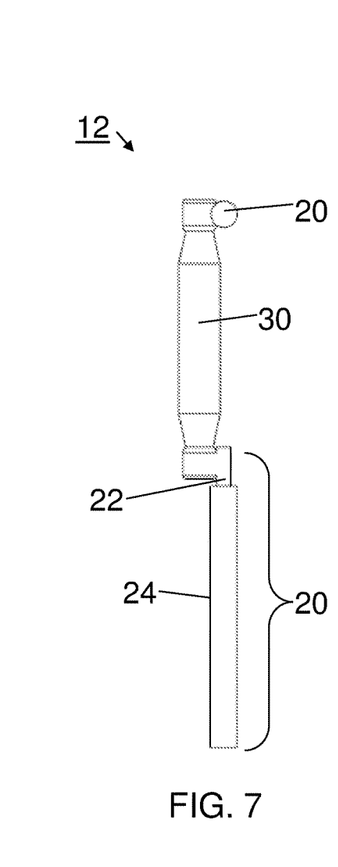
FIG. 7 is a side view of the welded fuse of FIG. 6.

FIGS. 6 and 7 depict wire segments 20 welded to fuse 30. As would be understood by those in the art, insulation 24 is absent at exposed wire 22 of wire segment 20 to facilitate the weld. Although welding is the preferred means of forming a junction between wire segment 20 and fuse 30, it should be understood that other means known in the art, for example crimping, fuse clips, and soldering could also be used.

Although the present invention could be used with a variety of wires types, wire segments 20 are preferably photovoltaic wires from 18 AWG to 1000 MCM, and most preferably 8, 10, or 12 gauge, which are commercially available from Southwire of Carrolton, Ga.

A variety of fuse types could be integrated into the present invention, including PV fuses having an ampacity of 2 to 30 amps, which are commercially available as an HP10M fuse from Mersen of Newburyport, Mass.; and 1500 V fuses which are commercially available as HP15M series from Mersen of Newburyport, Mass.

Figure 8:
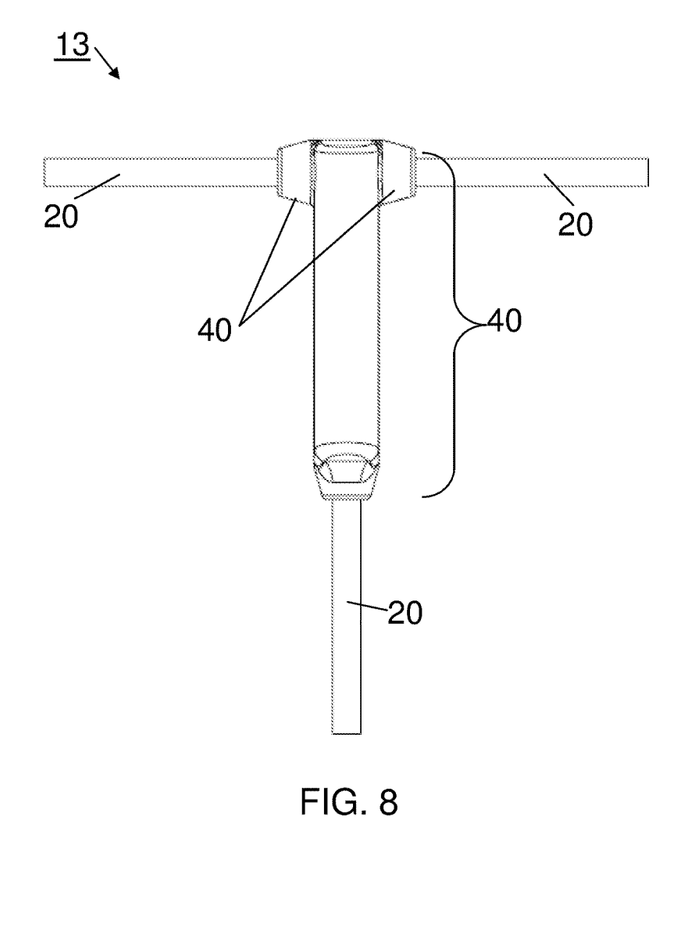
FIG. 8 is an undermolded fuse.
Figure 9:
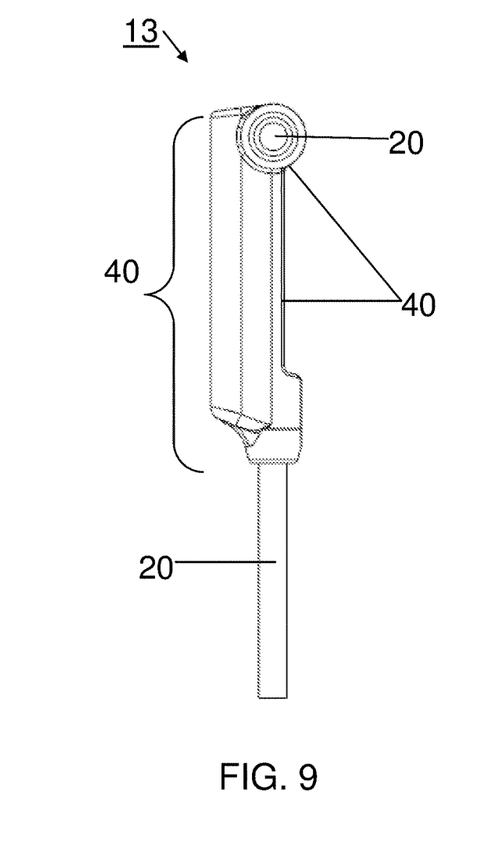
FIG. 9 is a side view of the undermolded fuse shown in FIG. 8.

FIGS. 8 and 9 depict undermolded fuses 13, which are welded fuses 12 plus undermold 40. Undermold 40 is preferably deposited by injection molding processes known in the art, but other methods such as compression molding, transfer molding, calendering, and extrusion could also be employed. It should be noted that undermold 40 preferably fully encases fuse 30 as well as exposed wire 22, but leaves wire segment 20 substantially bare. Undermold 40 is preferably approximately 1 to 5 mm thick, and constructed of a thermoplastic having low flammability, good adhesion, and a high dielectric value (electrically isolating). An example of a suitable thermoplastic for undermold 40 is RTP 2099 from RTP Plastics of Winona, Minn.

Figure 10:
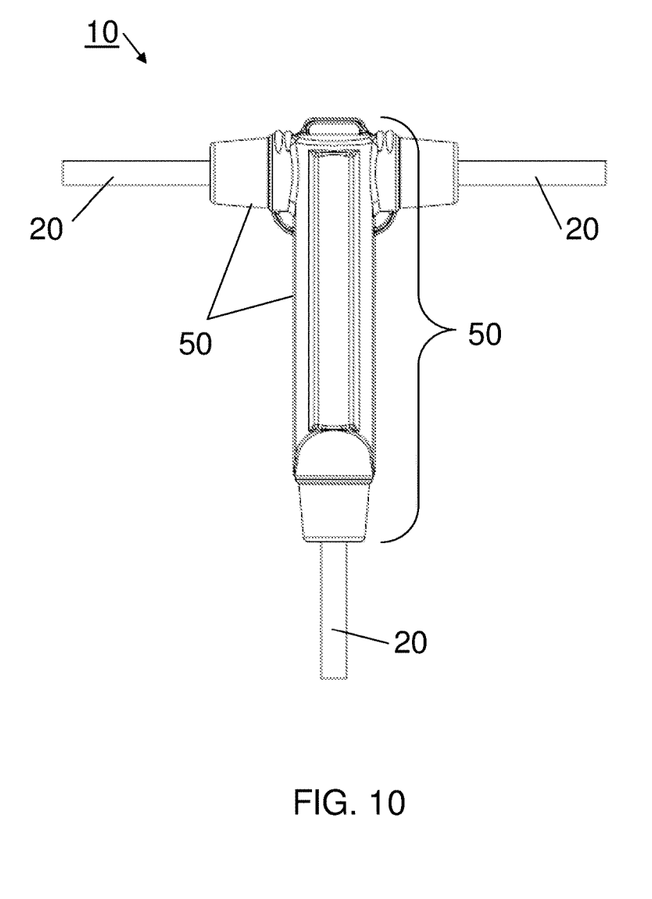
FIG. 10 is an overmolded fuse (fuse joint)
Figure 11:
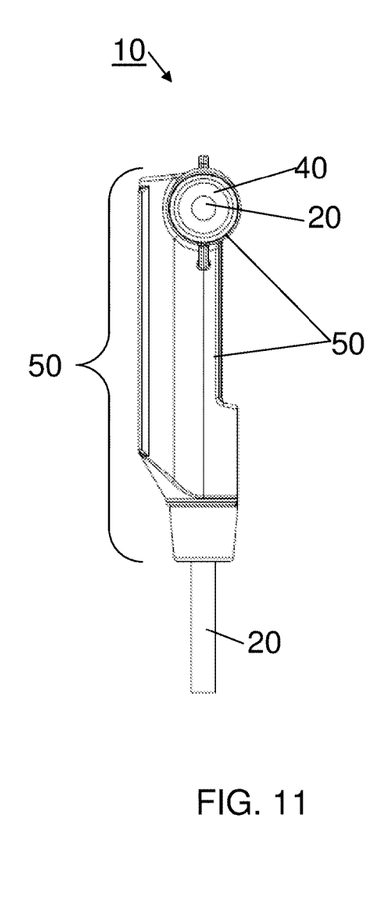
FIG. 11 is a side view of the overmolded fuse (fuse joint) shown in FIG. 10.

FIGS. 10 and 11 depict finished fuse joint 10, which are undermolded fuses 13 plus overmold 50. Overmold 50 is preferably deposited by injection molding processes known in the art, but other methods such as compression molding, transfer molding, calendering, and extrusion could also be employed. It should be noted that overmold 50 preferably fully encases undermold 40 and small portions (approximately 5 to 25 mm) of wire segment 20 near undermold (not shown), but leaves wire segment 20 substantially bare. Overmold 50 is preferably approximately 1 to 5 mm thick, and constructed of a thermoplastic having low flammability, high impact strength, high dielectric value (electrically isolating), and that is UV resistant. An example of a suitable thermoplastic for overmold 50 is RTP 199 from RTP plastics of Winona, Minn.

It should be understood that both undermolding and overmolding are preferably manufactured in situ, versus manufactured as separate parts and added to the fuse and undermolding, respectively, in an assembly process.

Figure 13:
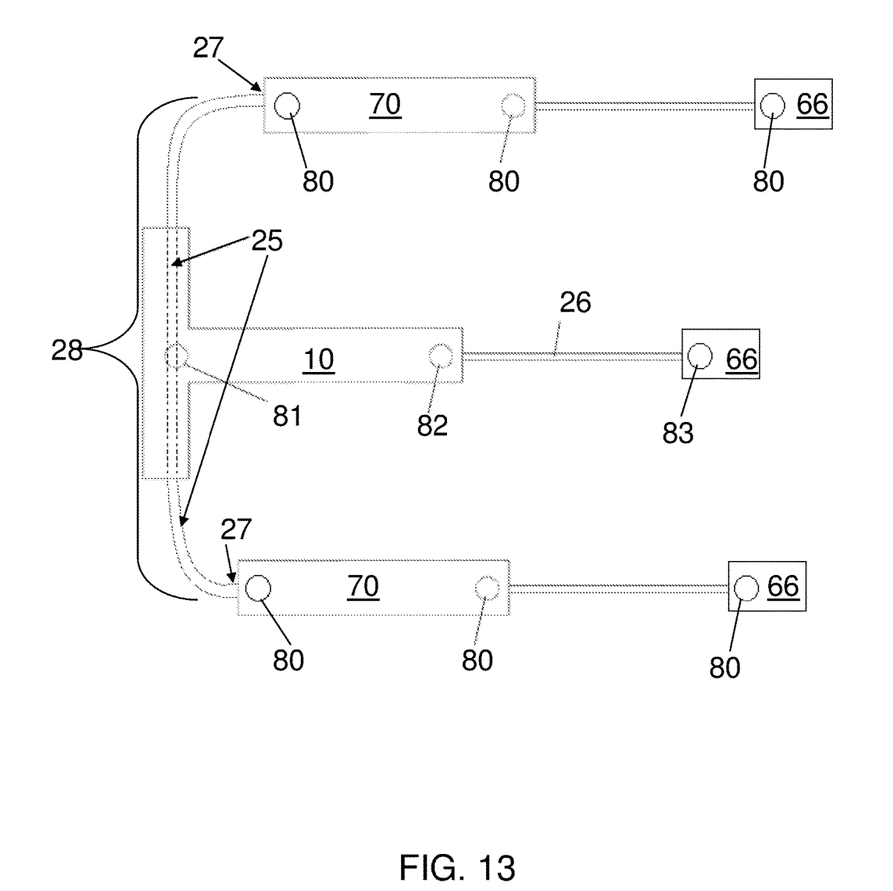
FIG. 13 depicts the middle portion of a wire segment attached directly to a fuse.

FIG. 13 highlights an inventive feature of the current invention wherein wire middle portion 28 directly interfaces with fuse 70 at first connection point 81. Wire middle portion 28 is the section of wire between wire ends 27, 27. This is an unusual structural feature insofar as fuses are conventionally attached to wire ends, and not to middle portions.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. For example, it should be understood that the undermold and overmold could become one unit (a single mold) should the material and conditions allow. It should be understood that all specifications, unless otherwise stated or contrary to common sense, are ±10%. It should also be understood that ranges of values set forth inherently include those values, as well as all increments between.

What is claimed is:

1. A fuse joint including:
   A) a fuse;
   B) a first wire segment having two ends and a middle portion there between, said middle portion attached directly to said fuse at a first connection point;
   C) a second wire segment attached directly to said fuse at a second connection point, said second wire segment having two ends and a middle portion there between;
   D) an undermolding surrounding said fuse; and
   E) an overmolding surrounding said undermolding.

2. The fuse joint of claim 1 wherein said second connection point is positioned on one of said ends.

3. The fuse joint of claim 1 wherein said second connection point is positioned on one of said ends.

4. The fuse joint of claim 1 consisting of exactly two connection points.

5. The fuse joint of claim 1 further comprising a connector directly attached to said second wire segment at a third connection point.

6. The fuse joint of claim 5 consisting of exactly three connection points.

7. A wire harness comprising:
   A) a plurality of joints each including two wire segments directly attached to a fuse, each wire segment having two ends and a middle portion, with one of said wire segments attached directly to said fuse at a middle portion;
   B) an undermolding surrounding each fuse;
   C) an overmolding surrounding each undermolding; and
   D) a plurality of connectors upstream from said joints.

8. The wire harness of claim 7 wherein said wire segment is attached directly to a second fuse at an end of said wire segment.

9. The wire harness of claim 8 wherein the total quantity of said connectors equals the total quantity of fuses.

10. The wire harness of claim 7 wherein said wire segments include exposed wire, said undermolding fully encasing said exposed wire.

11. The wire harness of claim 10 wherein said overmolding fully encases said undermold.

12. The wire harness of claim 7 wherein said overmold encases an approximately 5 to 25 mm length of wire segment protruding from said undermold.

13. A method of manufacturing a fuse joint including the steps of:
   A) connecting a middle portion of a wire to a fuse;
   B) undermolding said fuse to form an undermold encasement; and
   C) overmolding said undermold encasement.

14. The method of claim 13 wherein said undermolding is selected from a method selected from the group consisting of injection molding, compression molding, transfer molding, calendaring, extrusion and combinations thereof.

15. The method of claim 14 wherein said undermolding step is performed in situ.

16. The method of claim 13 wherein said overmolding is selected from a method selected from the group consisting of injection molding, compression molding, transfer molding, calendaring, extrusion and combinations thereof.

17. The method of claim 16 wherein said undermolding step is performed in situ.

* * * * *